United States Patent
Korcz et al.

(10) Patent No.: US 10,084,296 B2
(45) Date of Patent: Sep. 25, 2018

(54) CONDUIT SUPPORT BRACKET FOR ELECTRICAL BOX

(71) Applicant: Hubbell Incorporated, Shelton, CT (US)

(72) Inventors: Krzysztof Korcz, Grainger, IN (US); Steve Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/261,347

(22) Filed: Sep. 9, 2016

(65) Prior Publication Data
US 2017/0077689 A1    Mar. 16, 2017

Related U.S. Application Data

(60) Provisional application No. 62/216,761, filed on Sep. 10, 2015.

(51) Int. Cl.
*H02G 3/08* (2006.01)
*H02G 3/12* (2006.01)

(52) U.S. Cl.
CPC ............. *H02G 3/083* (2013.01); *H02G 3/123* (2013.01)

(58) Field of Classification Search
CPC ........... H02G 3/10; H02G 3/083; H02G 3/123
See application file for complete search history.

(56) References Cited

U.S. PATENT DOCUMENTS

| 3,536,281 A | 10/1970 | Meehan et al. | |
| 3,713,200 A | 1/1973 | Burns | |
| 5,239,129 A * | 8/1993 | Ehrenfels | H02B 1/28 174/50 |
| 5,527,990 A * | 6/1996 | Comerci | H02G 3/126 174/502 |
| 6,378,173 B1 * | 4/2002 | Ho | E05D 3/12 16/366 |
| 7,316,376 B1 * | 1/2008 | Engler | F16M 11/08 248/218.4 |
| 2003/0182881 A1 | 10/2003 | Denier et al. | |
| 2008/0029287 A1 | 2/2008 | Korcz et al. | |
| 2010/0000783 A1 | 1/2010 | Tally et al. | |

OTHER PUBLICATIONS

PCT/US2016/051053 International Search Report and Written Opinion dated Nov. 21, 2016 (12 pages).

* cited by examiner

*Primary Examiner* — Dhirubhai R Patel
(74) *Attorney, Agent, or Firm* — Michael Best & Friedrich, LLP

(57) ABSTRACT

An electrical box assembly includes an electrical box and a bracket. The electrical box includes a plurality of walls, one of the walls including at least one hole for receiving a conduit. The bracket includes a first portion and a second portion. The first portion is coupled to the electrical box, and the second portion includes at least one finger for extending at least partially around and gripping an outer surface of the conduit. The second portion is pivotable relative to the first portion.

23 Claims, 9 Drawing Sheets

CONDUIT SUPPORT BRACKET FOR ELECTRICAL BOX

CROSS REFERENCE TO RELATED APPLICATION

This application claims the benefit of prior-filed, co-pending U.S. Provisional Patent Application No. 62/216,761, filed Sep. 10, 2015, the entire contents of which are incorporated by reference herein.

BACKGROUND

This disclosure relates generally to electrical boxes and particularly to electrical boxes for housing electrical power and/or low voltage (data, multi-media, audio/visual ("A/V") & communications) devices.

Conventional electrical boxes for routing electrical power and communication conduit are often used in commercial buildings and the like. In some circumstances, a conduit is inserted into the box and extends out of the box at an angle. The weight of the conduit or other forces may bend or pull the conduit.

SUMMARY

In one aspect, an electrical box assembly includes an electrical box and a bracket. The electrical box includes a plurality of walls, one of the walls including at least one hole for receiving a conduit. The bracket includes a first portion and a second portion. The first portion is coupled to the electrical box, and the second portion includes at least one finger for extending at least partially around and gripping an outer surface of the conduit. The second portion is pivotable relative to the first portion.

In another aspect, a support bracket is provided for an electrical box. The electrical box includes a first wall including a hole receiving a conduit. The support bracket includes a first end configured to be coupled to the electrical box, and a second end including a finger for engaging the conduit. The second end is pivotable relative to the first end.

In yet another aspect, a method is provided for securing a conduit relative to an electrical box. The electrical box includes an opening and a support bracket having a first end coupled to the electrical box. The method includes: inserting an end of the conduit into the opening; pivoting a second portion of the support bracket relative to a first end that is coupled to the electrical box; and engaging the conduit with the second portion of the support bracket.

Other aspects will become apparent by consideration of the detailed description and accompanying drawings.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

As used herein "substantially", "generally", and other words of degree, are used as a relative modifier intended to indicate permissible variation from the characteristic so modified. It is not intended to be limited to the absolute value or characteristic, which it modifies but rather approaching or approximating such a physical or functional characteristic.

DETAILED DESCRIPTION

Figure 1:
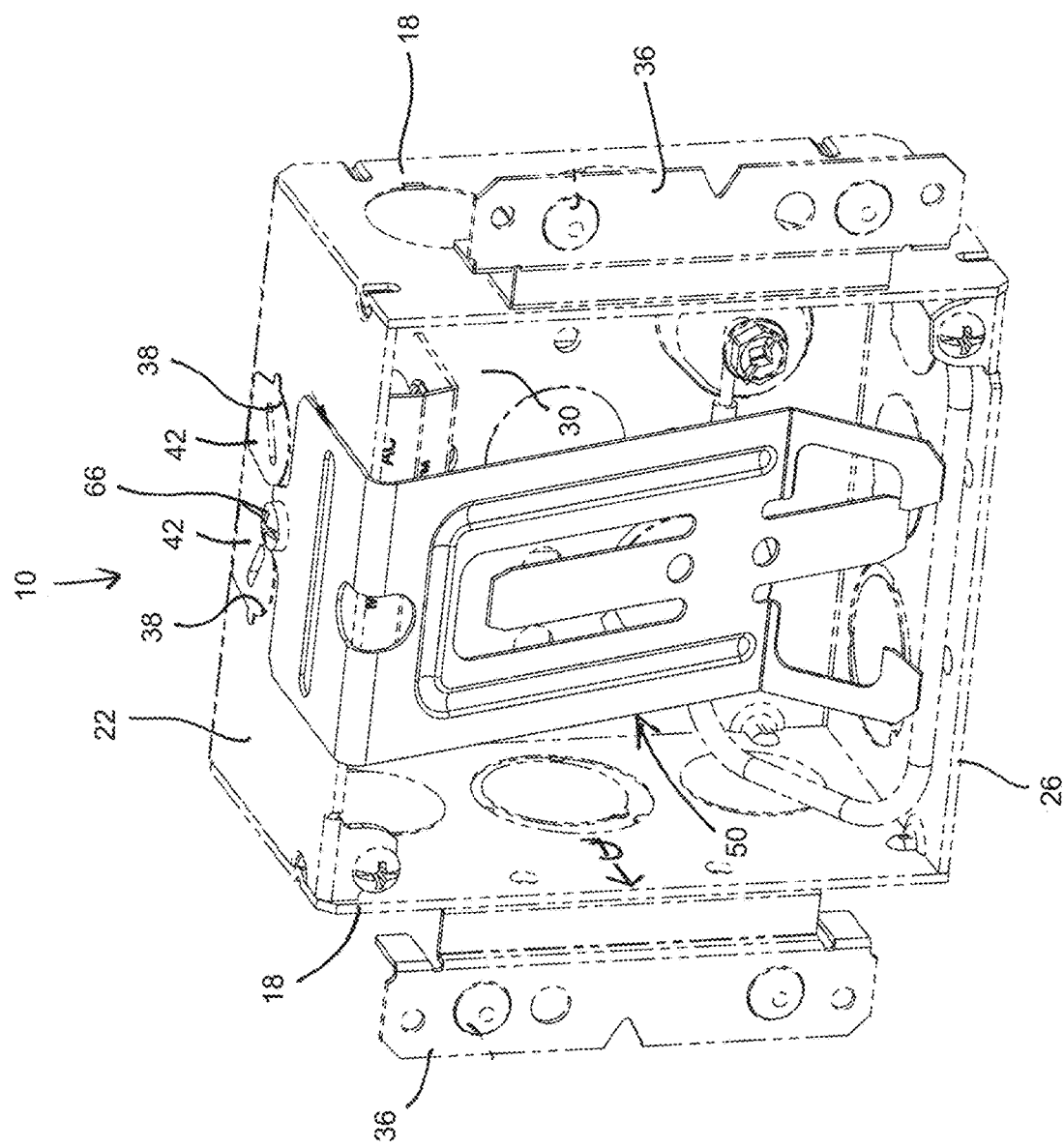
FIG. 1 is a perspective view of an electrical box with a support bracket in a collapsed position.
Figure 2:
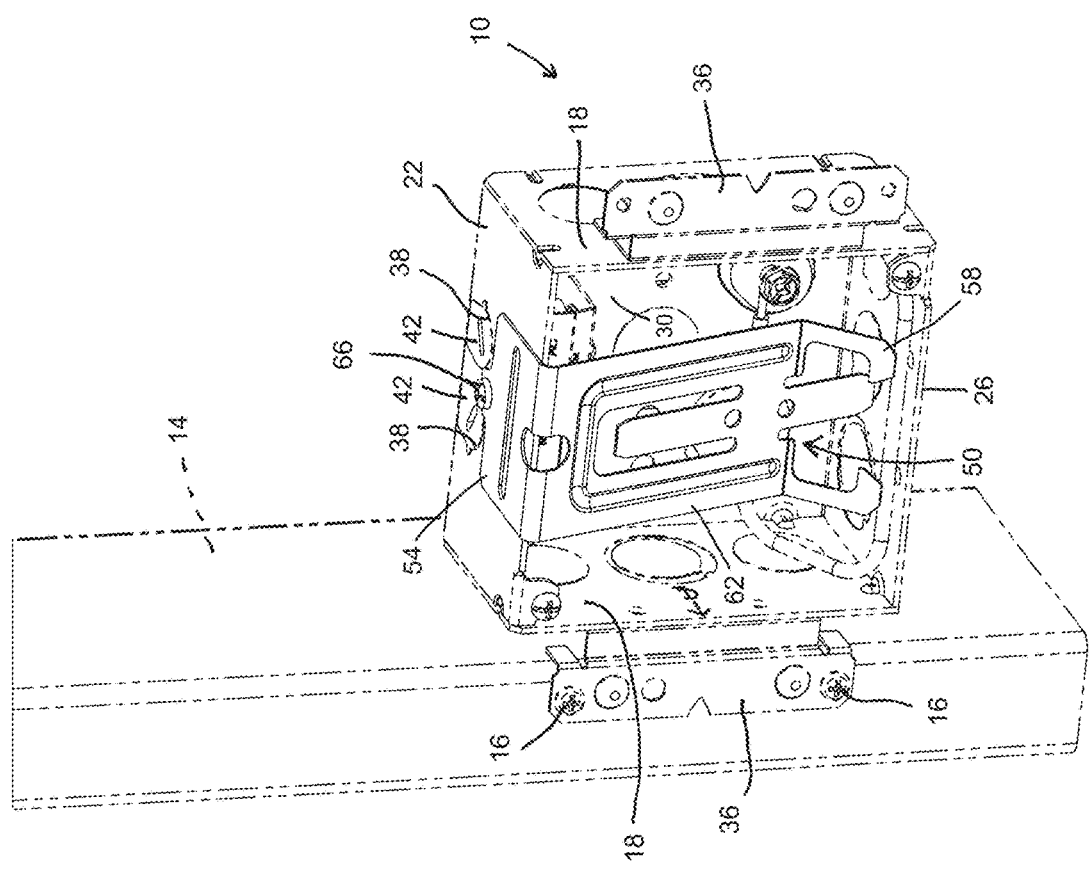
FIG. 2 is a perspective view of the electrical box of FIG. 1 coupled to a wall support.
Figure 8:
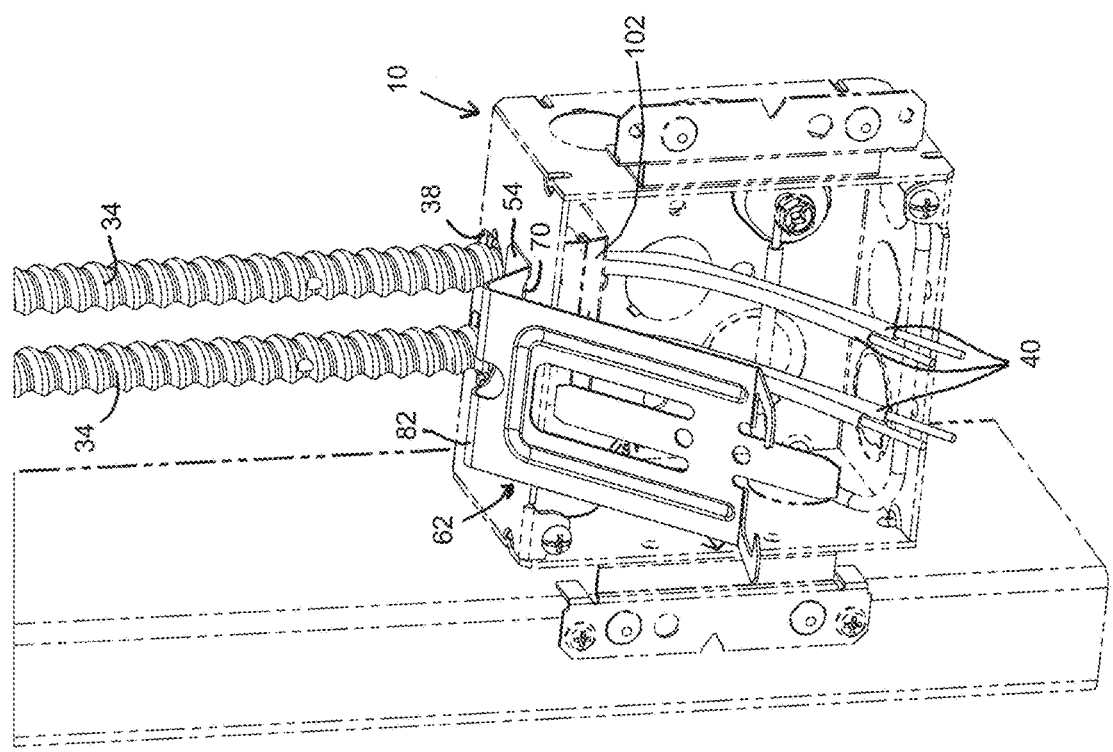
FIG. 8 is a perspective view of the electrical box of FIG. 7 with conduit ends extending into the box.

FIGS. 1 and 2 illustrate an electrical box 10, which may be coupled to a wall support or stud 14 (FIG. 2), for example by fasteners 16 (FIG. 2). In other embodiments, the electrical box 10 may be supported on a bracket or other structure. The box 10 has a generally rectangular shape and includes side walls 18, an upper wall 22, a lower wall 26, a rear wall 30. In the illustrated embodiment, the walls 18, 22, 26, and 30 form a partially enclosed portion having an open front. The box 10 may support one or more electrical devices (not shown), and receives wires or conduits 34 (FIG. 8). In the illustrated embodiment, each side wall 18 includes a mounting bracket 36, and the upper wall 22 includes a pair of holes 38. A pry-out or insert 42 is positioned within each hole 38, and each insert 42 includes a slot to receive a tool (e.g., a blade of a screwdriver). In other embodiments, the brackets 36 and holes 38 may be positioned on different walls of the box 10. In addition, the walls 18, 22, 26, 30 of the electrical box 10 may include one or more removable knockout portions.

Referring now to FIG. 2, a support bracket 50 is coupled to the box 10. In the illustrated embodiment, the support bracket 50 includes a first end portion 54, a second end portion 58, and an intermediate portion 62 between the first portion 54 and the second portion 58. The support bracket 50 is shown in FIG. 2 in an initial or stowed or collapsed position such that the second portion 58 is positioned substantially within the box 10. This position may facilitate easier shipping of the assembled box 10 and bracket 50. In the illustrated embodiment, the first end portion 54 is secured to the upper wall 22, for example, by a clamp screw or other fastener 66 (FIGS. 1 and 2), and the intermediate portion 62 and second portion 58 are bent partially around the upper wall 22 and inwardly through the open front of the box 10.

FIGS. 3-6 illustrate the support bracket 50 in an initial state. The support bracket 50 includes an elongated slot 70 positioned between the first portion 54 and the intermediate portion 62 to facilitate bending therebetween. Stated another way, when a moment is applied on the support bracket 50 to move the second portion 58 out of the enclosed portion of the box 10, the intermediate portion 62 bends relative to first end portion 54 along the elongated slot 70 (or at least along a bend line that is substantially parallel to the elongated slot 70).

Figure 3:
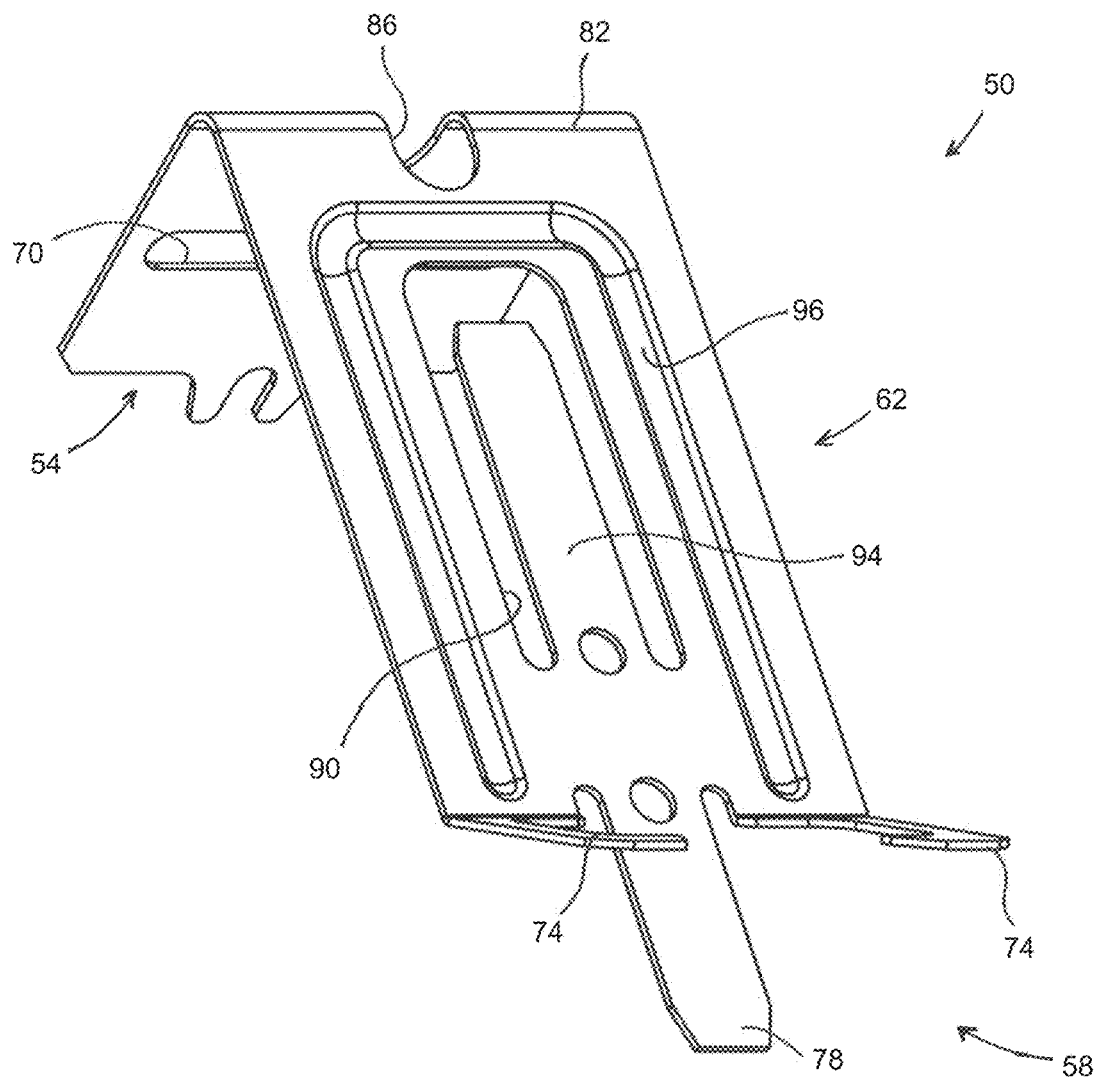
FIG. 3 is a perspective view of the support bracket.
Figure 4:
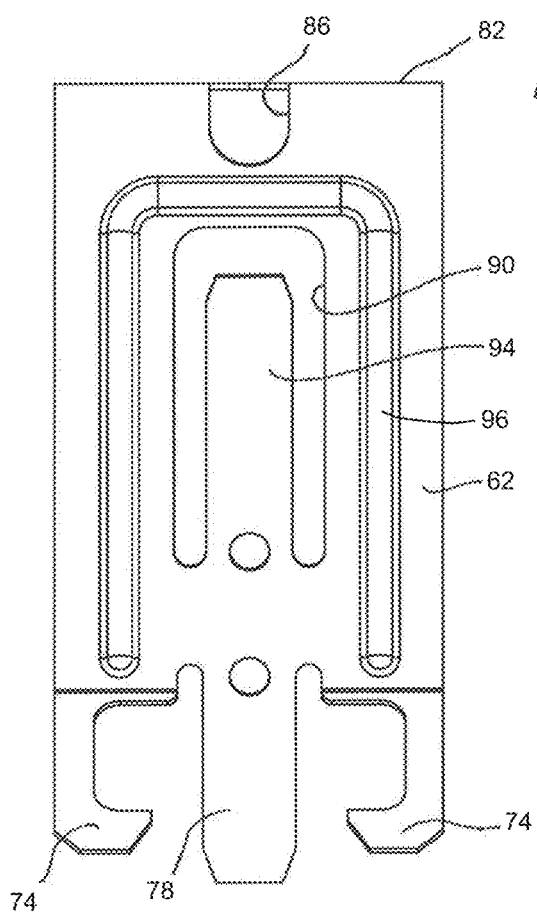
FIG. 4 is an elevation view of the support bracket.

As shown in FIGS. 3 and 4, the second portion 58 includes a pair of hook-shaped fingers 74 positioned on each side of the support bracket 50. An end of each finger 74 curves inwardly from the side edge of the support bracket 50 towards a centerline, such that the ends of the fingers 74 are oriented toward each other. In addition, a first tab 78 is positioned between the fingers 74. In the initial position shown in FIG. 3, the fingers 74 are also bent out of plane with the intermediate portion 62 (that is, oriented at an angle relative to the intermediate portion 62), and the first tab 78 is aligned in the same plane as the intermediate portion 62.

Figure 5:
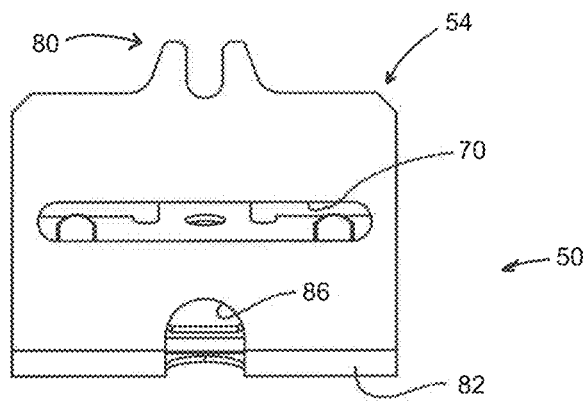
FIG. 5 is an end view of the support bracket.

As shown in FIG. 5, the first portion 54 is initially coplanar with a portion of the intermediate portion 62. The first portion 54 also includes a formation (e.g., protrusions 80) for receiving the fastener 66 to secure the bracket 50 to the box 10.

Figure 6:
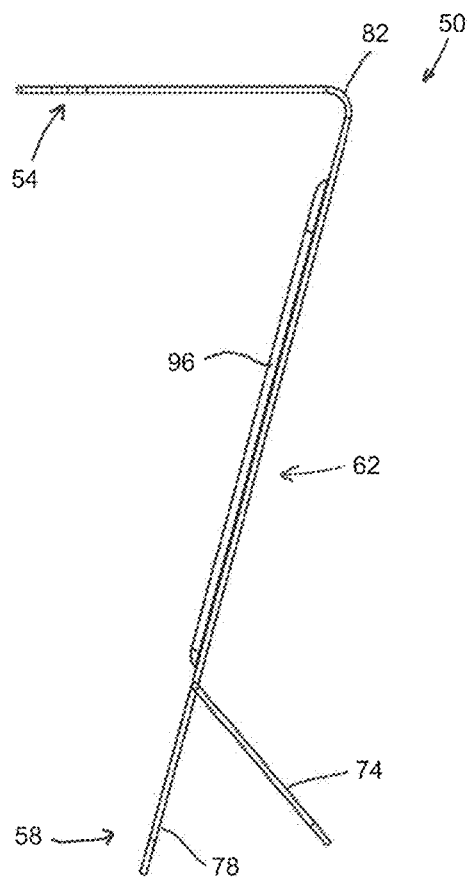
FIG. 6 is a side view of the support bracket.

As shown in FIGS. 4 and 6, the intermediate portion 62 includes a bend 82 and a hole 86 positioned on the bend 82. The intermediate portion 62 further includes an opening 90 and a second tab 94 extending into the opening. In the initial state, the second tab 94 is oriented in the same plane as the intermediate portion 62. In the illustrated embodiment, the intermediate portion 62 also includes a boss or depression 96 for increasing the rigidity of the intermediate portion 62.

Figure 7:
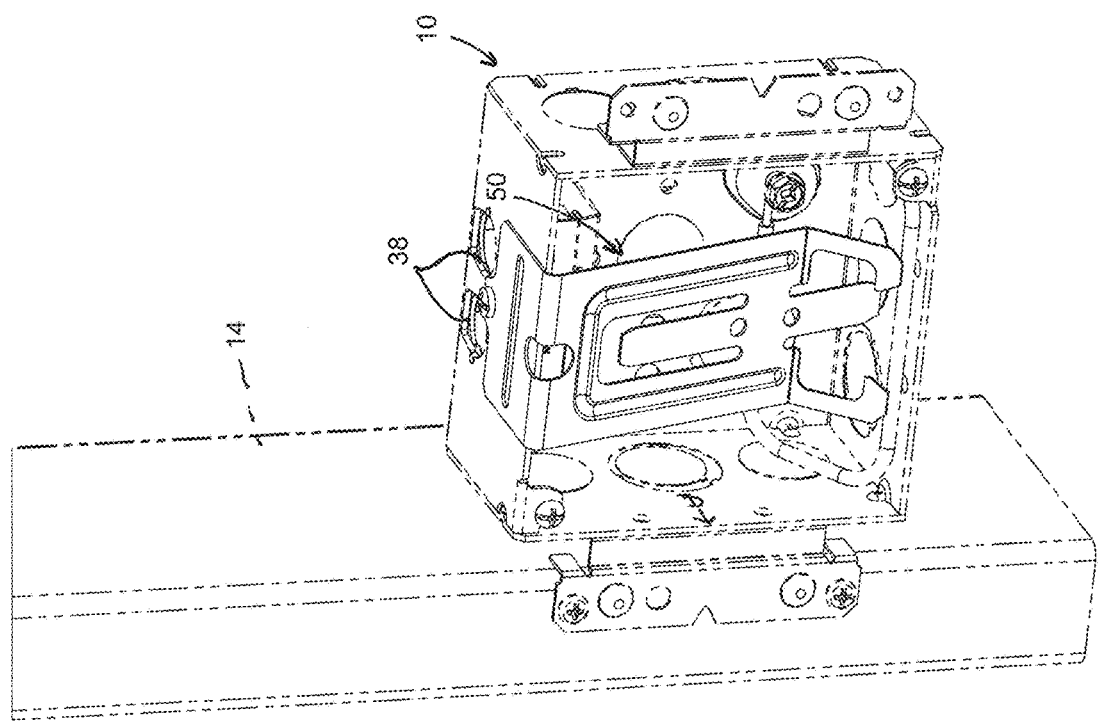
FIG. 7 is a perspective view of the electrical box of FIG. 2 with inserts removed.

FIGS. 7-10 illustrate the process for deploying or positioning the support bracket 50 to engage the wire conduits 34. First, as shown in FIG. 7, the inserts 42 (FIG. 2) are removed from the holes 38. Next, as shown in FIG. 8, a moment is applied to the support bracket 50 such that the intermediate portion 62 pivots or bends relative to the first end portion 54 along the elongated slot 70. The intermediate portion 62 is partially pivoted so that the second portion 58 is not positioned within the box 10. The ends of the conduits 34 are then inserted into each of the holes 38. In some embodiments, a retention mechanism 102 for securing the ends of the conduits 34 relative to the box 10 is included. The sheath or cover of the conduits 34 may be gripped proximate the wall 22, and the wires 40 extend into the box 10. In one embodiment, the upper wall 22 includes a retention mechanism for securing the ends of the conduits 34 relative to the box 10.

Figure 9:
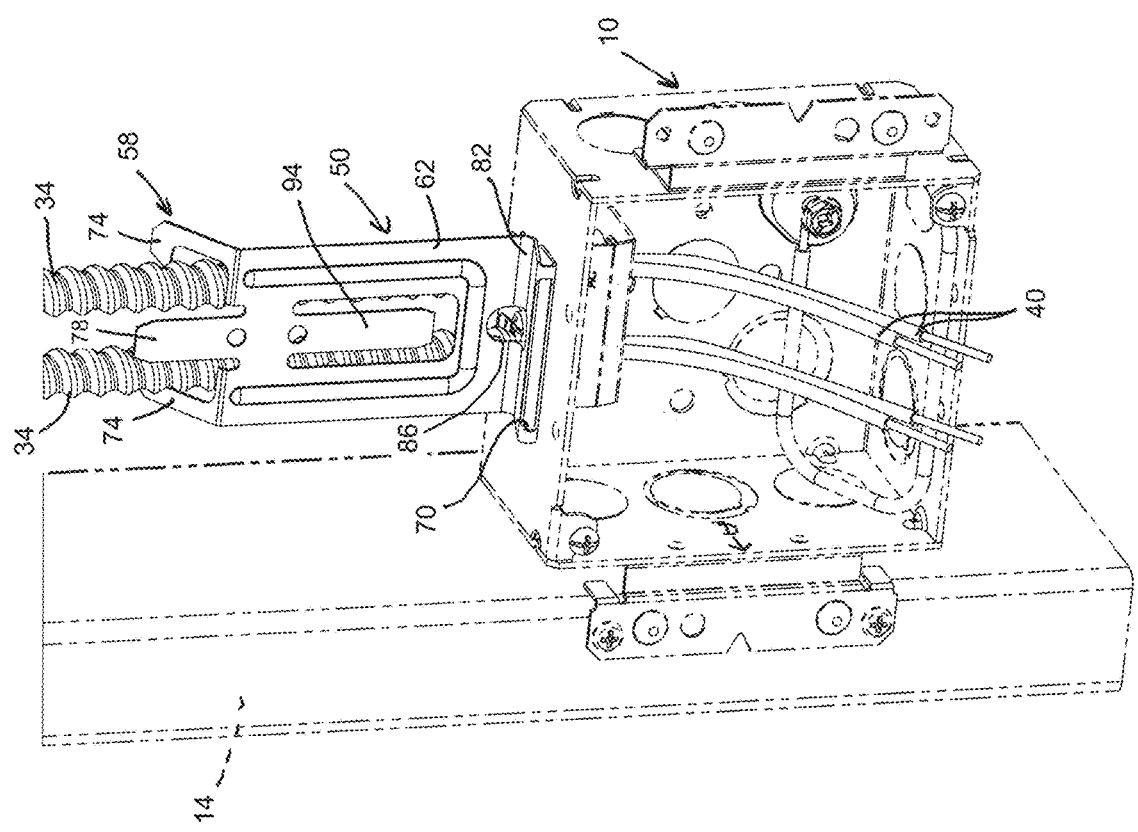
FIG. 9 is a perspective view of the electrical box of FIG. 8 with the support bracket pivoted to an open position.
Figure 10:
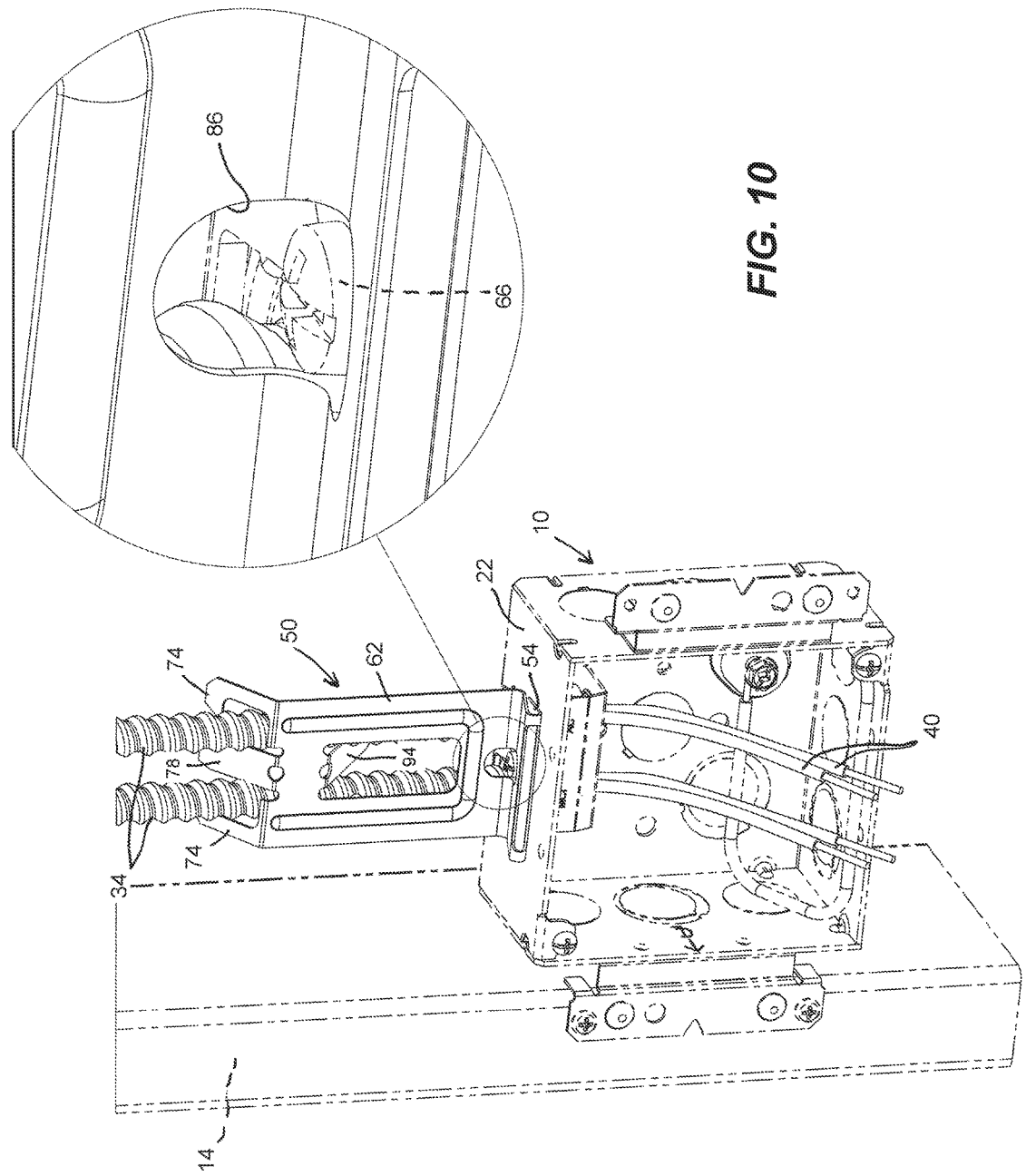
FIG. 10 is a perspective view of the electrical box of FIG. 9 with tabs in a folded position.

Referring now to FIG. 9, the intermediate portion 62 is pivoted further about the slot 70 until the second end portion 58 engages the conduits 38. In particular, each of the fingers 74 wrap at least partially around one of the conduits 38 and contact or engage the outer surface of the conduits 38. Finally, as shown in FIG. 10, the first tab 78 and the second tab 94 are pivoted relative to the intermediate portion 62 to bias the conduits 38 away from one another and into engagement with the fingers 74, thereby locking or securing the conduits 38. In the illustrated embodiment, the first tab 78 is pivoted in a first direction relative to the intermediate portion 62 so that the first tab 78 is oriented in a plane that is substantially parallel to the fingers 74. The second tab 94 is pivoted relative to the intermediate portion 62 in a second direction opposite the first direction. The hole 86 proximate the bend 82 provides a clearance slot for a screwdriver or other tool to engage and remove the fastener 66 in order to remove the support bracket 50 from the box 10 (e.g., for disassembly or servicing).

Figure 11:
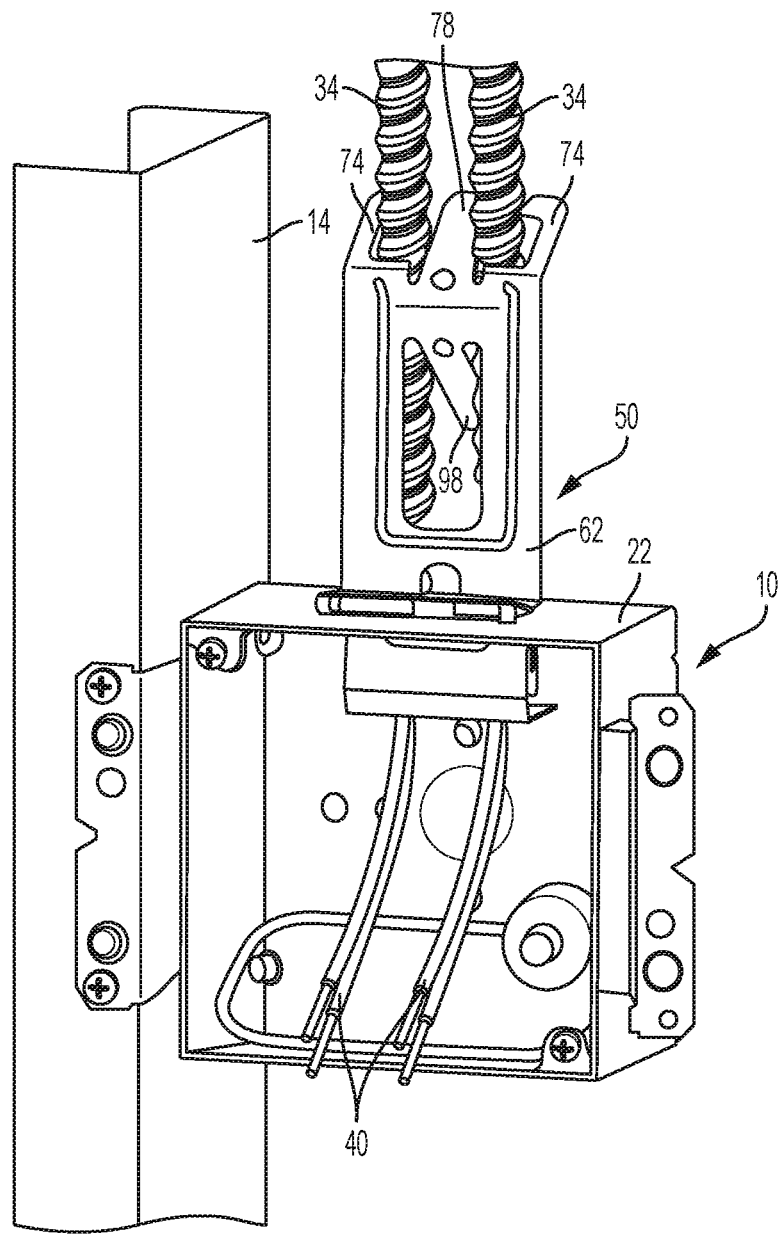
FIG. 11 illustrates the electrical box with the support bracket in an open position.

In the deployed or open position (FIG. 11), the support bracket 50 engages the conduits 34 and maintains the conduits 34 at a desired position and/or angle relative to the electrical box 10. The support bracket 50 supports the weight of the conduits 34, preventing the conduits 34 from sagging or creating stress on the wires 40.

It would be understood that a device or method incorporating any of the additional or alternative details mentioned above would fall within the scope of the disclosure as determined based upon the claims below and any equivalents thereof.

Other aspects, objects and advantages of the disclosure can be obtained from a study of the drawings, the disclosure and the appended claims. Although certain embodiments have been described in detail, variations and modifications exist within the scope and spirit of one or more independent aspects as described.

We claim:

1. An electrical box assembly comprising:
an electrical box including a plurality of walls, one of the walls including at least one hole for receiving a conduit; and
a bracket including a first portion and a second portion, the first portion coupled to the electrical box, the second portion including at least one finger for extending at least partially around and gripping an outer surface of the conduit, the second portion being pivotable relative to the first portion.

2. The electrical box assembly of claim 1, wherein the bracket further includes a tab spaced apart from the at least one finger by a gap, wherein the conduit is configured to be positioned in the gap between the tab and the finger.

3. The electrical box assembly of claim 1, wherein the bracket includes an intermediate portion positioned between the first portion and the second portion, wherein the intermediate portion is pivotable relative to the first portion about a bend line, the intermediate portion movable between a first position and a second position.

4. The electrical box assembly of claim 3, wherein the second portion is pivotable with the intermediate portion about the bend line such that bending the intermediate portion positions the second portion adjacent the conduit.

5. The electrical box assembly of claim 4, wherein the first portion is coupled to the electrical box by a fastener, wherein the intermediate portion includes a hole adjacent the bend and aligned with a fastener.

6. The electrical box assembly of claim 1, wherein the one wall includes a pair of holes, each hole receiving a conduit, and wherein the second portion includes a pair of fingers, each finger curving away from a side edge of the second portion toward a centerline such that the ends of the fingers are positioned proximate each other.

7. The electrical box assembly of claim 6, wherein the bracket further includes a tab positioned between the fingers, the tab configured to bias the conduits toward the respective fingers.

8. The electrical box assembly of claim 7, wherein the tab is a first tab and the bracket further includes a second tab extending away from the first tab.

9. A support bracket for an electrical box, the electrical box including a first wall including a hole receiving a conduit, the support bracket comprising:

a first end configured to be coupled to the electrical box;

a second end including a finger for engaging the conduit, the second end being pivotable relative to the first end.

10. The support bracket of claim 9, wherein the second end includes a pair of fingers forming hook-like projections, the hook-like projection facing toward one another.

11. The support bracket of claim 10, wherein each finger is configured to extend at least partially around an outer surface of one of a pair of conduits, the support bracket further comprising at least one tab that is positioned between the fingers and configured to bias the conduits toward each of the fingers.

12. The support bracket of claim 11, wherein the at least one tab includes a first tab pivotable in a first direction and a second tab pivotable in a second direction.

13. The support bracket of claim 11, wherein the at least one tab is pivotable relative to the fingers.

14. The support bracket of claim 9, further comprising an intermediate portion positioned between the first end and the second end, wherein the intermediate portion is pivotable relative to the first end between a first position and a second position.

15. The support bracket of claim 14, wherein the intermediate portion includes a bend for positioning the intermediate portion and the finger at a desired angle relative to the conduit.

16. A method for supporting a conduit relative to an electrical box, the electrical box including an opening and a support bracket having a first portion coupled to the electrical box, the method comprising:

inserting an end of the conduit into the opening;

pivoting a second portion of the support bracket relative to the first portion that is coupled to the electrical box; and engaging the conduit with the second portion of the support bracket.

17. The method of claim 16, further comprising, prior to inserting the end of the conduit, removing an insert from the opening.

18. The method of claim 16, wherein pivoting the second portion of the support bracket includes bending an intermediate portion relative to the first portion in order to position the second portion adjacent the conduit.

19. The method of claim 16, wherein engaging the conduit includes moving a finger to extend at least partially around an outer surface of the conduit.

20. The method of claim 19, further comprising positioning at least one tab against the conduit to bias the conduit against the finger.

21. The method of claim 16, wherein inserting an end of the conduit includes inserting the ends of a pair of conduits into separate openings in the electrical box, wherein engaging the conduit includes moving a pair of fingers such that each finger extends at least partially around an outer surface of each conduit.

22. The method of claim 21, further comprising positioning at least one tab between the conduits to bias the conduits against each respective finger.

23. The method of claim 22, wherein positioning at least one tab includes pivoting one tab in a first direction relative to the fingers and pivoting a second tab in a second direction opposite the first direction.

* * * * *